Oct. 10, 1967    P. H. DIXON    3,346,095
VIBRATORY FEEDING MECHANISM
Filed June 9, 1965    3 Sheets-Sheet 2

INVENTOR
Paul H. Dixon
by: Wolfe, Hubbard, Voit & Osann
ATTORNEY

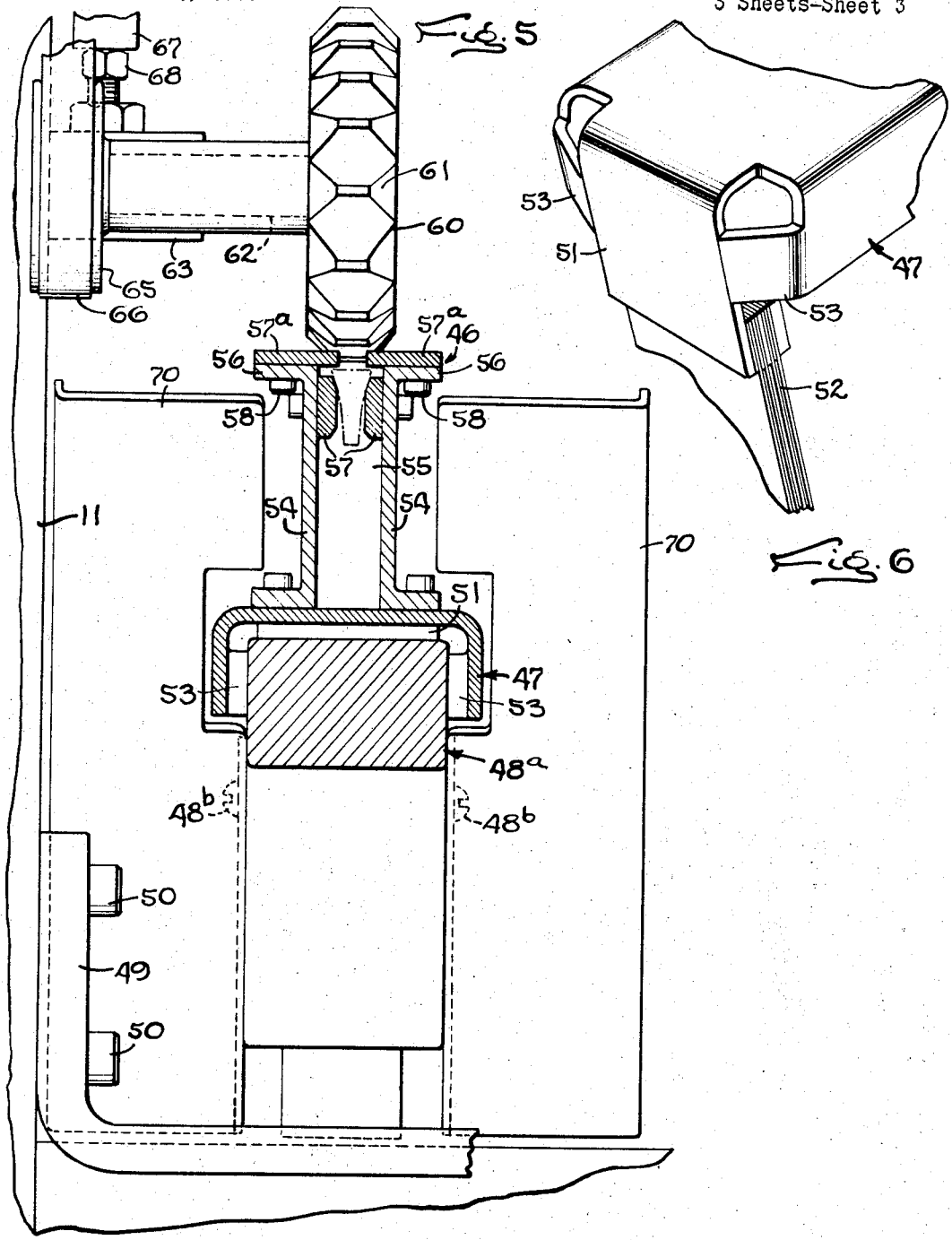

3,346,095
VIBRATORY FEEDING MECHANISM
Paul H. Dixon, Rockford, Ill., assignor to Dixon Automatic Tool Inc., Rockford, Ill., a corporation of Illinois
Filed June 9, 1965, Ser. No. 462,558
2 Claims. (Cl. 198—33)

This invention relates to a vibratory feeding mechanism of the type including a vibratory delivery track for advancing workpieces along a predetermined path.

The primary object of the present invention is to provide in a vibratory feed mechanism of the foregoing type a new and improved workpiece return system for returning improperly oriented workpieces from the delivery track to a workpiece supply hopper.

A more detailed object is to vibrate a return chute for returning improperly oriented workpieces to the hopper with the same vibratory drive unit used for advancing the workpieces along the primary delivery track.

Other objects and advantages of the invention will become apparent from the following detailed description taken in conection with the accompanying drawings, in which:

FIG. 5 is an enlarged vertical sectional view taken along the line 5—5 in FIG. 1.

FIG. 6 is an enlarged perspective view of the rear end portion of the improved vibratory drive.

While the invention will be described in connection with certain preferred embodiments, it is to be understood that the invention is not intended to be limited to the disclosed embodiments but, on the contrary, is intended to cover the various modifications and equivalent arrangements included within the spirit and scope of the appended claims.

Figure 3:
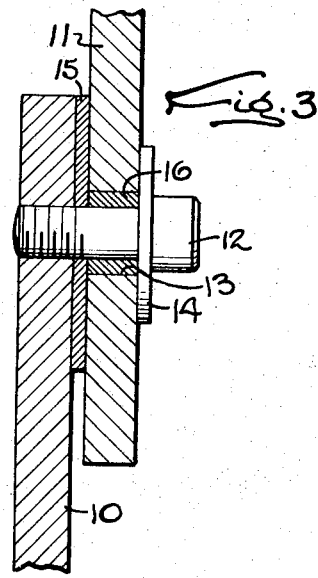
FIG. 3 is an enlarged fragmentary sectional view taken along the line 3—3 in FIG. 1 to show the internal structure of the base mounting arrangement.

Turning now to the drawings, the illustrative embodiment of the improved feeding mechanism provided by the invention includes a base member 10 which supports an annular frame member 11 with the mounting connection between the base member 10 and the annulus 11 being adapted to permit limited rotational movement of the annulus 11 relative to the stationary base member 10. Thus, the annulus 11 is mounted on the base member 10 by means of a pair of bolts 12 extending through a pair of corresponding arcuate slots 13 formed in the annulus 11, with each bolt 12 being threaded into a portion of the base member 10 adjacent the back surface of the annulus 11, as illustrated most clearly in FIGS. 1 and 3. Each of the bolts 12 passes through a corresponding washer 14 which overlaps the circumferential edges of the respective slot 13 and bears against the outer surface of the annulus 11.

To facilitate rotational displacement of the annulus 11 relative to the base member 10, the adjacent surfaces of the base member 10 and the annulus 11 are spaced apart by means of a washer 15 fitted over each bolt 12. Also, a small bearing sleeve 16, which may be made of nylon for example, is fitted over the shank portion of each bolt 12 so as to bear against the inner surfaces formed by the slot 13. It will be apparent that the annulus 11 may be adjusted through a limited circumferential distance relative to the base member 10 by simply loosening the bolts 12 and rotating the annulus 11 through the desired distance with the opposed surfaces formed by the slots 13 riding over the bearing sleeves 16 on the stationary bolts 12.

In the present instance, a rotatable workpiece supply and transfer assembly and an operatively associated vibratory track assembly are mounted at angularly spaced points on the annulus 11 so that the angle of inclination of the track assembly may be adjusted by rotational displacement of the annulus 11 without changing the desired relative positions of any of the operating parts of the feeding mechanism. Thus, turning first to the workpiece supply and transfer assembly, a multiplicity of workpieces, such as screws or bolts or the like are initially deposited in a hopper 20 having an inclined bottom 21 which delivers the workpieces into the bottom of a rotatable drum 22. As the drum 22 is rotated, bucket-like transfer elements 23 mounted on the inner periphery of the drum 22 pick up batches of workpieces at the bottom of the drum, transfer the workpieces to the top of the drum, and then discharge the workpieces by gravity onto a receiving chute 24.

The hopper 20 is mounted on the front surface of the annulus 11 by means of a plurality of bolts 25 which pass through apertures in a depending hopper flange 25a into threading engagement with the annulus 11. The front panel of the hopper 20 is also secured by means of a bolt 26 to a shaft 27 supported within a sleeve 28 which is secured to the lower end of an elbow member 29. The elbow member 29 is suspended from the annulus 11 by securing the upper end of the elbow to the upper portion of the annulus 11 by means of a mounting plate 30 and a plurality of bolts 31 which extend through the mounting plate 30 into threading engagement with the annulus 11.

In order to permit rotation of the workpiece transfer drum 22, the drum is mounted on a hub 32 which is mounted for rotation about a pair of bearing sleeves 33 fitted over a rearwardly projecting end portion of the shaft 27. The shaft 27 is held stationary within its supporting sleeve 28 by means of a set screw 34, and a thrust washer 35 is positioned between the adjacent ends of the sleeve 28 and the hub 32. The drum is secured to the hub 32 by means of a plurality of bolts 36 which are threaded into a radially extending flange 37 formed on the end of the hub 32. To hold the hub 32 firmly in place against the thrust washer 35, a second thrust washer 38 is drawn inwardly against the end of the hub 32 by means of a washer 39 and a bolt 40 which is threaded into the end of the stationary shaft 27.

For the purpose of rotating the drum 22 and its supporting hub 32 about the shaft 27, a V belt 41 is trained about the outer periphery of the drum 22. The V belt 41, and thus the drum 22, is driven by a motor 42 via a drive pulley 43, and both the motor 42 and the pulley 43 are mounted on a bracket 44 which is secured to the front surface of the annulus 11 by a plurality of bolts 45. In order to maintain the desired degree of tension in the V belt 41, an idler pulley 46' bears against the length of V belt trained between the drive pulley 43 and the top of the drum 22. The idler pulley 46' is rotatably mounted on an arm 46a which is rigidly secured to the annulus 11.

It will be appreciated at this point that the supply hopper 20, the transfer drum 22, the drive motor 42 and the various elements operatively associated therewith are all mounted on the annular frame member 10 without varying the relative positions of any of the operating parts. Moreover, any of these parts may be removed, such as for repair or for replacement purposes for example, and then replaced without the necessity for disassembling the entire machine and without any time-consuming aligning operations.

As the drum 22 is rotated by the V belt 41, the transfer elements 23 within the drum scoop up batches of workpieces from the bottom of the drum and transfer the workpieces to the top of the drum where the workpieces are discharged by gravity onto a vibratory track assembly including the workpiece-receiving chute 24. In addition to the receiving chute 24, the vibratory track assembly includes an elongated track member 46 which is mounted on the carrier frame 47 of a vibratory drive unit 48 which, in turn, is mounted on the annulus 11 by means of a bracket 49 and bolts 50. The vibratory drive unit 48 may be of a conventional type including an electromagnetic drive motor 48a for importing vibratory motion to the carrier frame 47. The driving impulses are generally applied to the carrier frame 47 at a slight upward angle so that the resulting vibrating motion has at least a small vertical component which causes the workpieces to "hop" along the vibrating track. To permit vibratory movement of the carrier frame 47, it is conventionally provided with a pair of depending legs 51 at opposite ends thereof for mounting on a pair of leaf spring assemblies 52. Suitable vibratory drive units of this type are described, for example, in U.S. Patents 2,331,820 and 2,187,717.

Since the vibratory driving impulses are conventionally applied to only one end of the carrier frame 47, it has been found that the vibratory movement varies from one end of the frame to the other. Moreover, this variation in the vibratory motion is even greater at the opposite ends of the track 46, which projects longitudinally in both directions beyond the frame 47. This phenomenon has been found to inhibit movement of the workpieces at the receiving end of the vibratory track, and in some cases may cause jamming of the workpieces at that end of the track. In the present instance, this problem is overcome by providing the carrier frame 47 with opposed depending side flanges having longitudinal tabs 53 which are bent in against the edges of the supporting leg 51 of the carrier frame 47 at the opposite end from which the driving impluses are applied. This substantially increases the vibratory forces applied to the receiving end of the track, and thus insures substantially uniform movement of the workpieces along the entire length of the vibrating track.

Figure 4:
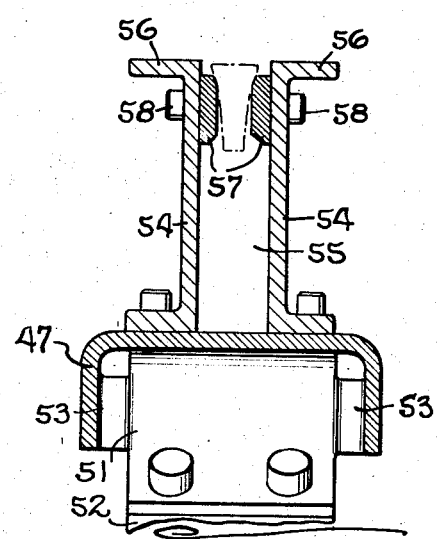
FIG. 4 is an enlarged fragmentary sectional view taken along the line 4—4 in FIG. 1.

As the workpieces are discharged from the drum 22 onto the receiving chute 24, they slide down over the vibrating inclined bottom surface of the chute onto the vibratory track 46. As shown most clearly in FIG. 4, the track 46 is formed by a pair of opposed, spaced apart channel members 54 defining an open channel 55 therebetween. Each channel member 54 includes an outwardly projecting horizontal flange 56 at the upper end thereof for receiving the workpieces from the chute 24. For the purpose of supporting and orienting the workpieces which drop into the channel 55, a pair of elongated orientation bars 57 are mounted on the opposed inner surfaces of the channel members 54 by means of plurality of bolts 58. The orientation bars 57 are spaced apart from each other by a distance designed to permit the shanks of the workpieces to extend downwardly therebetween, while the heads of the workpieces are supported on the upper edges of the opposed bars 57, as illustrated by the workpiece shown in broken lines in FIG. 4.

The drum 22 is usually rotated at a speed calculated to deliver workpieces to the chute 24 and the track 46 at a rate faster than required. Consequently, there are always a number of excess workpieces, that is, workpieces for which there is no room in the channel 55, lying on the horizontal flanges 54. In order to remove these excess workpieces from the vibartory track, a clearing wheel 60 is mounted for rotation adjacent the upper surface of the track at a point removed from the receiving end thereof. The clearing wheel 60 is provided with a plurality of peripheral teeth having bevelled side surfaces 61, as can be seen in FIG. 5, which tend to deflect any workpieces lying on the flanges 56. The bevelled teeth also serve to reduce the transverse area of the lowermost portion of the clearing wheel so as to reduce the possibility of the workpieces becoming jammed or clogged between the wheel of the track.

For the purpose of enabling the clearing wheel to be raised in the event of a workpiece jammed between the clearing wheel and the vibratory track, the clearing wheel shaft 62 is journaled on the end of a longitudinal arm 63 which is pivotally mounted on the annulus 11 at 64 and a pivoted latch lever 67 overlies an adjustable stop 68. Thus, if the workpieces jam or clog beneath the clearing wheel 60, it can be raised by simply swinging the lever 67 to one side and tilting the arm 63 upwardly about the pivot point 64 to permit quick and easy removal of the jammed workpieces. The shaft 62 carries a pulley 65 which receievs a drive belt 66 for driving the clearing wheel 62 and also holding it in the desired vertical position with respect to the track 46. The drive belt 66 derives its power from the same motor 42 and a drive pulley 43a. Properly oriented workpieces which have passed the wheel 60 are prevented from being jarred out of position by bars 57a which extend inwardly over the channel 55.

In accordance with an important aspect of this invention, return chutes vibrated by the drive unit 48 are provided for receiving the excess workpieces cleared from the track surface and returning such workpieces to a point directly below the axis of rotation of the drum 22. Thus, a pair of horizontal return chutes 70 are mounted on opposite sides of the vibratory carrier motor frame 48a by screws 48b for receiving the excess workpieces falling off the sides edges of the track flanges 54. Vibratory motion imparted to the return chutes 70 through the motor frame 48a causes the workpieces deposited thereon to be moved rapidly along the return chutes down into the hopper 20. The length and slope of the return chutes 70 are calculated to deposit the workpieces directly below the axis of rotation of the drum 22 where the rate of workpieec pickup is at a maximum so as to prevent the accumulation or piling up of workpieces at the discharge end of the return chutes. It will be recognized that relatively long return chutes are required to return the workpieces all the way to the center line of the rotating drum. However, according to the present invention, the vibratory motion of the return chutes permits the length thereof to be minimized by the use of relatively small slopes.

Figure 1:
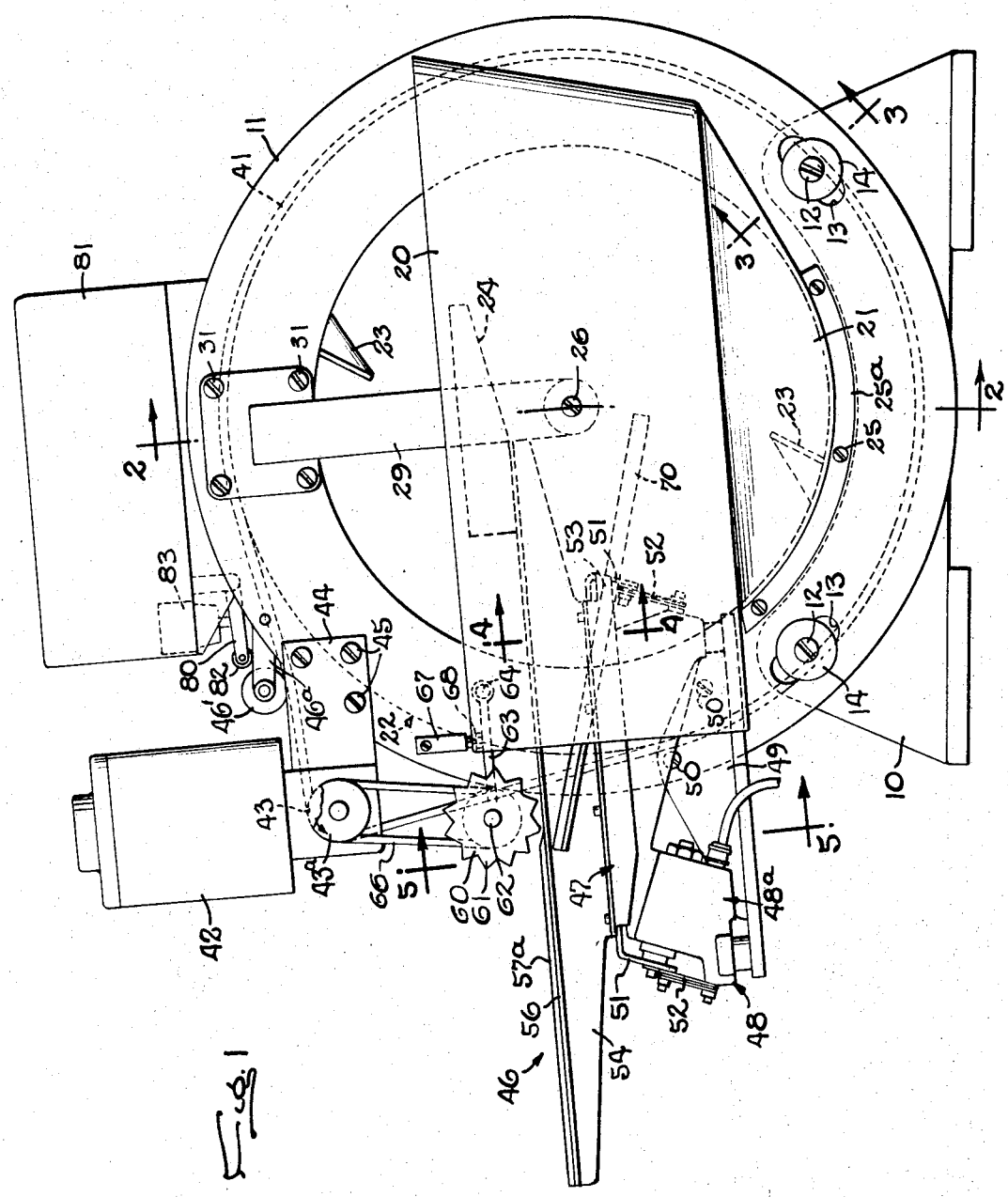
FIGURE 1 is a side elevation view of an improved vibratory feeding mechanism embodying the present invention.
Figure 2:
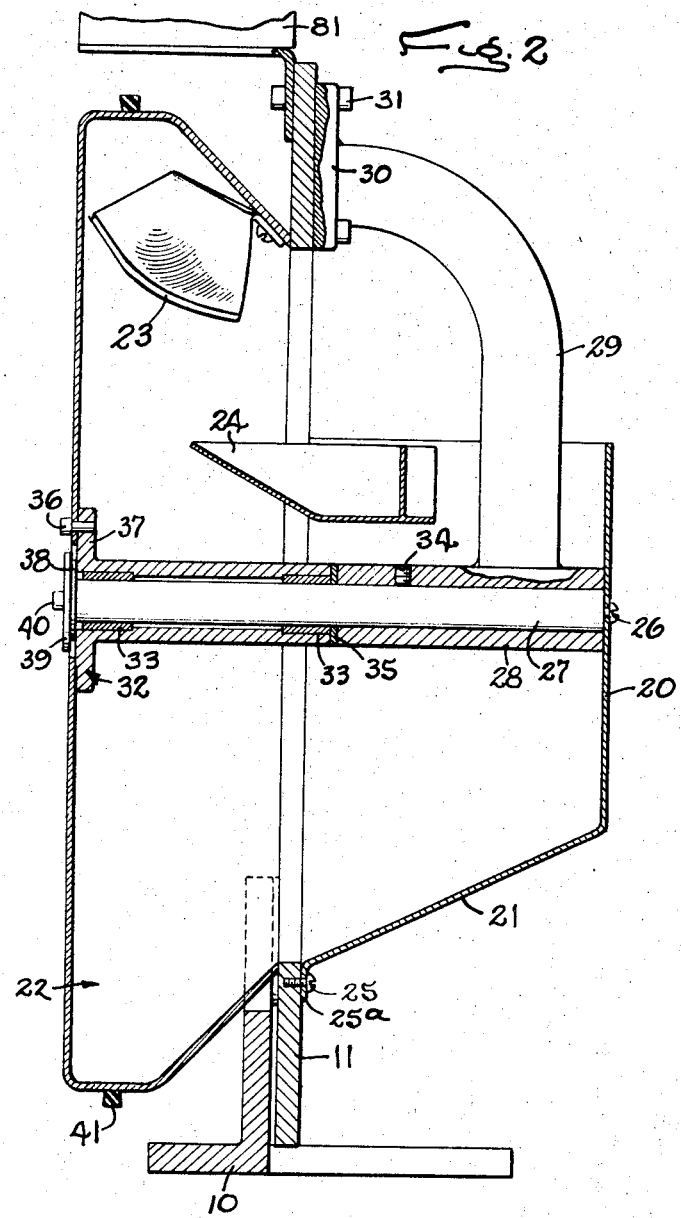
FIG. 2 is an enlarged vertical sectional view taken along the line 2—2 in FIGURE 1.

Herein, automatic stop means are provided for turning off the main drive motor 42 in the event of a jamming or clogging of the workpieces within the rotating drum 22. Thus, as shown in FIGURE 1, a control lever 80 is mounted below the main control housing 81 mounted on the top of the annulus 11. This control lever 80 carries a roller 82 bearing against the supporting arm for the idler pulley 46. If the drum 22 becomes jammed, it ceases to rotate, thereby causing the drive pulley 43 to tension that portion of the drive belt 41 between the pulley 43 and the upper portion of the drum 22. As the drive belt 41 is tensioned, it raises the idler pulley 46 slightly, which, in turn, raises the roller 82 and the control lever 80 and thereby depresses a main drive motor switch 83 to turn off the drive motor 42. This automatic shut-off feature avoids excessive loads on the drive motor and therefore extends the operative life of the drive system.

I claim as my invention:

1. A vibratory feeding mechanism for delivering workpieces to a predetermined operating station, said feeding mechanism comprising the combination of a track assembly for receiving workpieces at one end and delivering the same to a discharge end aligned with the desired operating station, said track assembly including means for orienting workpieces deposited on the track, a vibratory drive unit connected to said track assembly for vibrating the latter, workpiece supply means for supplying workpieces to the receiving end of the vibratory track assembly, clearing means for removing unoriented workpieces from the vibratory track, a pair of return chutes mounted on opposite sides of the vibratory track assembly for receiving the unoriented workpieces removed from the vibratory track and returning the same to the workpiece supply means, and means operatively connecting said return chutes to the same vibratory drive unit for vibrating said track assembly whereby said chutes are vibrated to assist the return movement of the unoriented workpieces.

2. In a vibratory feeding mechanism for delivering workpieces to a desired operating station, the combination comprising a track assembly for receiving workpieces at one end and delivering the same to a discharge end aligned with the operating station, said track assembly including means for orienting workpieces deposited on the track, a vibratory drive unit connected to said track assembly for vibrating the latter, workpiece supply means including a hopper and a rotatable drum for transferring workpieces from the hopper to the receiving end of the vibratory track, clearing means for removing unoriented workpieces from the vibratory track, a pair of return chutes mounted on opposite sides of the vibratory track for receiving the unoriented workpieces removed from the vibratory track and returning the same to substantially the center-line of the rotatable drum so that the returned workpieces are rapidly dissipated by the drum, and means operatively connecting said return chutes to the same vibratory drive unit for vibrating said track assembly thereby to assist the return movement of the unoriented workpieces along said return chutes.

References Cited

UNITED STATES PATENTS

| | | | |
|---|---|---|---|
| Re. 25,297 | 12/1962 | Garrett | 221—162 |
| 316,467 | 4/1885 | Libby | 221—156 |
| 1,476,064 | 12/1923 | Eynon | 221—156 |
| 1,692,456 | 11/1928 | Lynch et al. | 221—162 |
| 2,055,139 | 9/1936 | Andrews | 198—220 X |
| 2,187,717 | 1/1940 | Weyandt | 198—220 |
| 2,531,099 | 11/1950 | Anderson | 221—162 |
| 2,764,351 | 9/1956 | Broscomb et al. | 198—33 X |
| 2,880,852 | 4/1959 | Bergmann | 198—232 |
| 3,063,543 | 11/1962 | Schneider | 198—33 |
| 3,068,991 | 12/1962 | Prutton | 198—33 |

FOREIGN PATENTS

| | | |
|---|---|---|
| 1,071,135 | 3/1954 | France. |

EVON C. BLUNK, *Primary Examiner.*

ANDRES H. NIELSEN, *Examiner.*

M. L. AJEMAN, *Assistant Examiner.*